(12) United States Patent  (10) Patent No.: US 8,469,299 B2
Mandeville  (45) Date of Patent: Jun. 25, 2013

(54) COOKED MEAT SHREDDING APPARATUS

(76) Inventor: Robert Mandeville, North Platte, NE (US)

( * ) Notice: Subject to any disclaimer, the term of this patent is extended or adjusted under 35 U.S.C. 154(b) by 333 days.

(21) Appl. No.: 13/023,199

(22) Filed: Feb. 8, 2011

(65) Prior Publication Data
US 2011/0192928 A1  Aug. 11, 2011

Related U.S. Application Data

(60) Provisional application No. 61/302,799, filed on Feb. 9, 2010.

(51) Int. Cl.
*A47J 43/044* (2006.01)

(52) U.S. Cl.
USPC .................... 241/169.1; 241/278.1; 452/149

(58) Field of Classification Search
USPC ....... 241/169.1, 277, 278.1; 99/537; 452/141, 452/149
See application file for complete search history.

(56) References Cited

U.S. PATENT DOCUMENTS

| | | | | |
|---|---|---|---|---|
| 3,761,026 A * | 9/1973 | Rohmer | .................... | 241/199.12 |
| 4,209,135 A * | 6/1980 | Starks | ........................ | 241/46.17 |
| 5,775,986 A * | 7/1998 | Law et al. | .................... | 452/141 |
| 7,431,230 B2 * | 10/2008 | McPherson et al. | ............ | 241/30 |
| 7,988,541 B1 * | 8/2011 | Zehrer | ........................ | 452/149 |

* cited by examiner

*Primary Examiner* — Mark Rosenbaum
(74) *Attorney, Agent, or Firm* — Suiter Swantz pc llo

(57) ABSTRACT

A cooked meat shredding apparatus for use with a hand held power drill. The apparatus has cooked meat shredding pins attached to a rotating plate with an elongated shaft, adapted to engage a drill chuck.

8 Claims, 4 Drawing Sheets

COOKED MEAT SHREDDING APPARATUS

PRIORITY

The present application claims the benefit under 35 U.S.C. §119(e) of U.S. Provisional Application 61/302,799, filed Feb. 9, 2010, which is incorporated herein by reference.

FIELD OF THE INVENTION

The present invention relates generally to meat processing, and specifically to devices for shredding cooked meat.

BACKGROUND OF THE INVENTION

Shredding or "pulling" meat is a vital step when preparing many barbeque dishes. Generally, a chef slow cooks a piece of meat such as a pork butt, beef roast or beef brisket until the connective tissue in the piece of meat is largely broken down. Then the chef laboriously pulls the piece of meat apart to produce chunks suitable for whatever barbeque dish the chef is preparing. A chef may shred a piece of meat with his hands, or with simple implements such as a knife and fork; but hand shredding is a time consuming process. Alternatively, a chef may employ a mechanical shredding device, but mechanical shredding devices known in the art are complicated, dedicated machines only useful in large scale meat processing. Individuals wishing to shred a piece of cooked meat have no alternative other than manual pulling.

Consequently, it would be advantageous if an apparatus existed that is suitable for shredding cooked meat with the use of a power drill.

SUMMARY OF THE INVENTION

Accordingly, the present invention is directed to an apparatus for shredding cooked meat with the use of a power drill. The apparatus comprises an elongated shaft to connect a power drill to a shredding pin attachment plate. A plurality of shredding pins protrude form the shredding pin attachment plate to pierce a piece of cooked meat. When the power drill is operated, the shredding pin attachment plate rotates, thereby moving the shredding pins about an axis defined by the elongated shaft. Inertia due to the mass of the cooked meat opposes the motion due to the rotation of the shredding pin attachment plate; those opposing forces shear and tear the meat into chunks.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
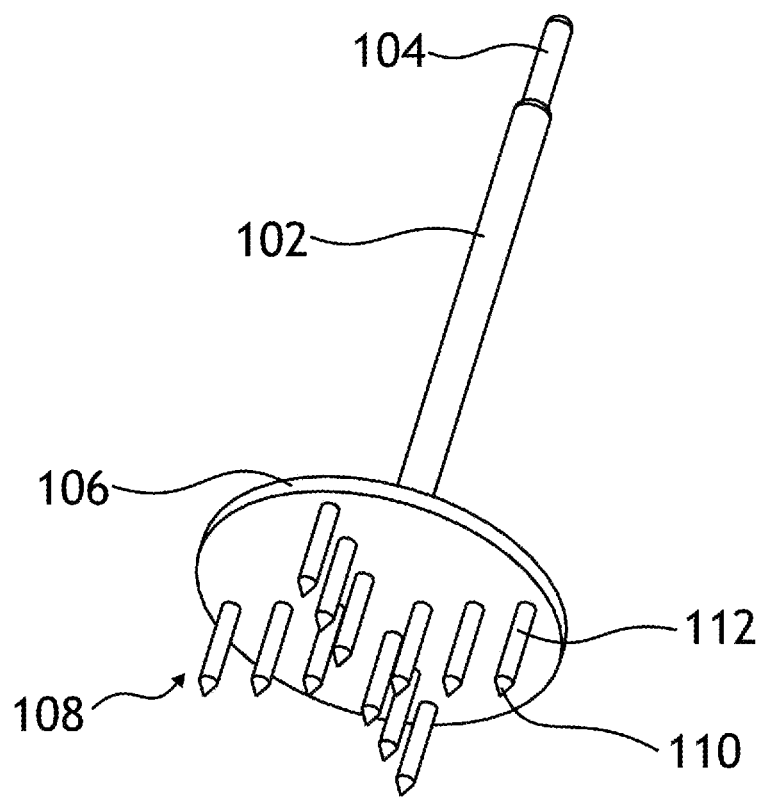
FIG. 1 shows a perspective view one embodiment of the present invention.
Figure 2:
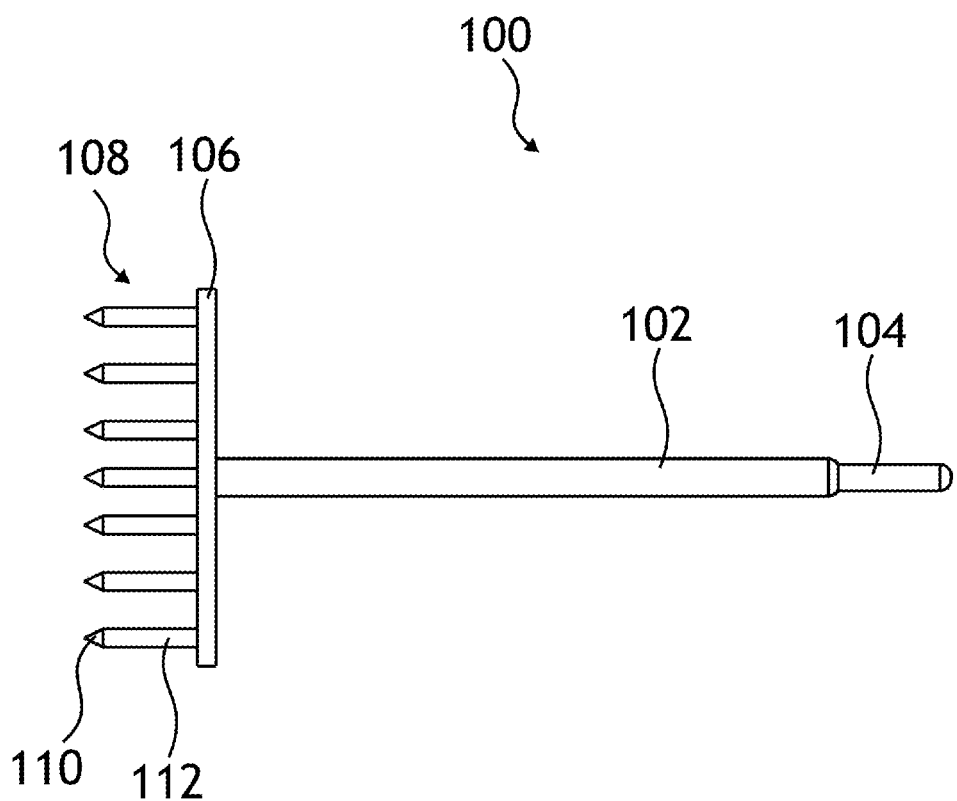
FIG. 2 shows a side view of the embodiment shown in FIG. 1.
Figure 3:
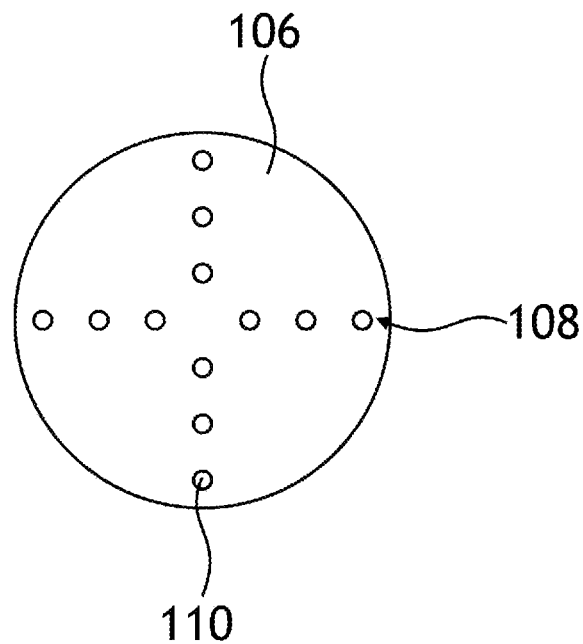
FIG. 3 shows a bottom view of the embodiment shown in FIG. 1.

Referring to FIG. 1, FIG. 2 and FIG. 3, one embodiment of the present cooked meat shredding apparatus 100 may have an elongated shaft 102; the elongated shaft may have a drill chuck engaging head 104 disposed on the proximal end of the elongated shaft. The drill chuck engaging head 104 may comprise a section of the elongated shaft 102 of a particular diameter to fit in an average drill chuck, or the drill chuck engaging head 104 may comprise a specially shaped section to efficiently transfer torque from a drill to the elongated shaft 102. The elongated shaft 102 may be comprised of any food safe material suitable for transferring a rotational force from a hand held power drill to a shredding pin attachment plate 106.

The cooked meat shredding apparatus may have a shredding pin attachment plate 106 functionally connected to the distal end of the elongated shaft 102. The shredding pin attachment plate 106 may be oriented perpendicular to an axis define by the elongated shaft 102. The elongated shaft 102 may be connected to the shredding pin attachment plate 106 at the center of mass of the shredding pin attachment plate 106 so that the cooked meat shredding apparatus 100 remains stable and balanced when a user applies a rotational force to the elongated shaft 102 with a hand held power drill. The elongated shaft 102 may be permanently connected to the shredding pin attachment plate 106 by any appropriate means such as welding, or the elongated shaft 102 may be releasably connected to the shredding pin attachment plate 106 by means such as a bolt passing through the shredding pin attachment plate 106 and engaging a threaded bolt hole in the distal end of the elongated shaft 102, thereby holding the shredding pin attachment plate 106 in place during operation, and allowing the user to remove the shredding pin attachment plate 106 for cleaning. The shredding pin attachment plate may be comprised of any food safe material suitable for transferring a rotational force from an elongated shaft 102 to a plurality of shredding pins 108, such as stainless steel or aluminum.

The cooked meat shredding apparatus may have a plurality of shredding pins 108 functionally connected to the shredding pin attachment plate 106. Whereas the elongated shaft 102 may protrude from the proximal surface of shredding pin attachment plate 106, the plurality of shredding pins 108 may be disposed on the shredding pin attachment plate 106 to protrude from the distal surface of the shredding pin attachment plate 106. The shredding pins 108 may be oriented along an axis substantially parallel to an axis defined by the elongated shaft 102. Furthermore, each shredding pin may have a shredding pin shaft 112 and a cooked meat piercing spike 110 disposed on the distal end of the shredding pin shaft 112 to pierce cooked meat. The shredding pins may be composed of any food safe material suitable for piercing and shredding cooked meat, such as stainless steel.

A user connects the cooked meat shredding apparatus to a power drill by placing the drill chuck engaging head 104 in a drill chuck and tightening the chuck so that the drill spins the cooked meat shredding apparatus 100 when the drill is engaged. The user than pushed shredding pins 108 of the cooked meat shredding apparatus 100 into a cooked piece of meat such as pork or beef. The drill imparts a rotational force on the elongated shaft 102, which in turn imparts a rotational force on the shredding pin attachment plate 106. Properly cooked meat has weakened connective tissue and may be pulled apart into chunks. The shredding pins 108 move in a circular motion, pulling apart the connective tissue of the piece of cooked meat. The disparity between the circular motion of the shredding pins 108 and the inertia of the piece of meat results in a tearing force acting on the piece of meat to break the piece of meat into chunks.

Figure 4:
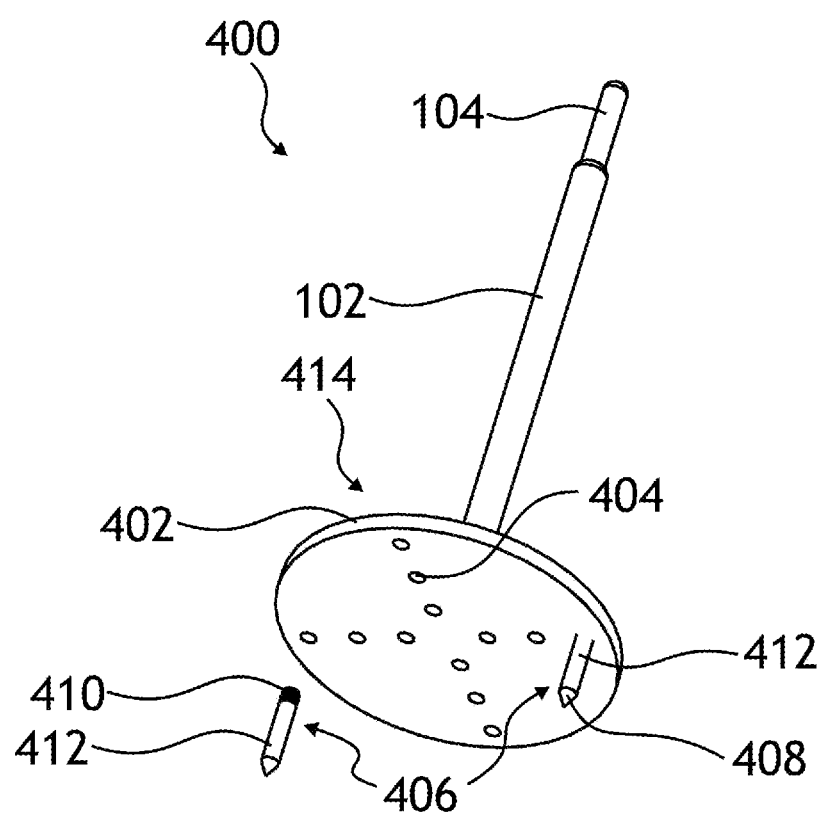
FIG. 4 shows a perspective view of another embodiment of the present invention.
Figure 5:
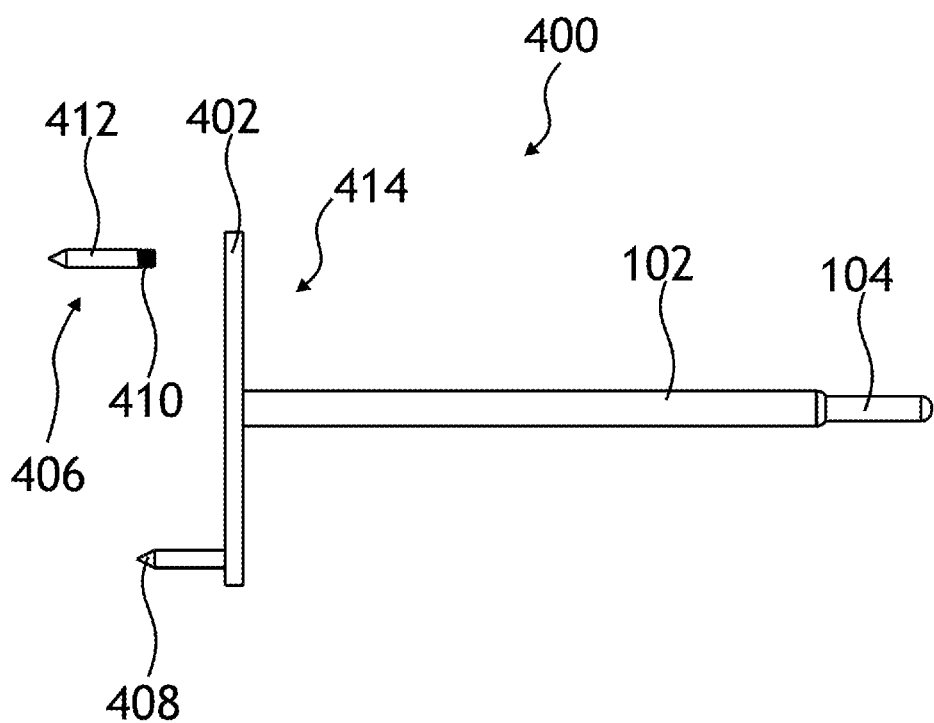
FIG. 5 shows a side view of the embodiment shown in FIG. 4.

Referring to FIG. 4 and FIG. 5, in another embodiment of the present invention, a cooked meat shredding apparatus 400 may have an elongated shaft 102, which may have a drill chuck engaging head 104 disposed on the proximal end of the elongated shaft 102. The elongated shaft may have a shredding pin attachment plate 414 disposed on the distal end of the elongated shaft 102; the shredding pin attachment plate may have a rotational force transfer body 402, and a plurality of threaded shredding pin connectors 404. The cooked meat shredding apparatus 400 may have a plurality of threaded shredding pins 406, each having a threaded rotational body connector 410 disposed on the proximal end of a shredding pin shaft 412, and a cooked meat piercing spike 410 disposed on the distal end of the shredding pin shaft 412. The threaded shredding pins 406 engage the shredding pin attachment plate 414. The rotational force transfer body 402 and threaded shredding pins 406 may be comprised of any food safe material suitable for transferring a rotational force and shredding cooked meat, such as stainless steel.

A user may add or remove threaded shredding pins 406 from the shredding pin attachment plate 414 by screwing pins into or out of the threaded shredding pin connectors 404. Adding threaded shredding pins 406 results in smaller chunks of shredded meat. This embodiment is also useful for cleaning the cooked meat shredding apparatus 400 because the individual elements are removable for easier access.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A cooked meat shredding apparatus comprising:
   an elongated shaft, configured to receive a rotational force applied about an axis defined by the elongated shaft;
   a shredding pin attachment plate disposed on the distal end of the elongated shaft, wherein the elongated shaft is oriented perpendicular to the shredding pin attachment plate, and wherein the elongated shaft is functionally connected to the shredding pin attachment plate at the center of mass of the shredding pin attachment plate, configured to transfer a rotational force applied to the elongated shaft to a plurality of shredding pins; and
   a plurality of shredding pins comprising:
      a shredding pin shaft; and
      a cooked meat piercing spike, disposed on the distal end of the shredding pin shaft, configured to pierce cooked meat,
      wherein the plurality of shredding pins is disposed on a surface of the shredding pin attachment plate.

2. The cooked meat shredding apparatus of claim 1, wherein the plurality of shredding pins are releasably connected to the shredding pin attachment plate.

3. The cooked meat shredding apparatus of claim 2, wherein the shredding pin attachment plate further comprises a plurality of threaded shredding pin attachment portions defined by the shredding pin attachment plate, and wherein at least one of the plurality of shredding pins comprises a threaded attachment plate engaging portion, wherein the threaded attachment plate engaging portion is configured to engage one of the plurality of threaded shredding pin attachment portions.

4. The cooked meat shredding apparatus of claim 1, wherein the elongated shaft further comprises a drill chuck engaging head disposed on the proximal end of the elongated shaft, configured to engage a drill chuck and efficiently receive a rotational force applied by a drill.

5. The cooked meat shredding apparatus of claim 4, wherein the plurality of shredding pins are releasably connected to the shredding pin attachment plate.

6. The cooked meat shredding apparatus of claim 5, wherein the shredding pin attachment plate further comprises a plurality of threaded shredding pin attachment portions defined by the shredding pin attachment plate, and wherein at least one of the plurality of shredding pins comprises a threaded attachment plate engaging portion, wherein the threaded attachment plate engaging portion is configured to engage one of the plurality of threaded shredding pin attachment portions.

7. A cooked meat shredding apparatus comprising:
   an elongated shaft, configured to receive a rotational force applied about an axis defined by the elongated shaft, and comprising a drill chuck engaging head disposed on the proximal end of the elongated shaft, configured to engage a power drill chuck;
   a shredding pin attachment plate disposed on the distal end of the elongated shaft, wherein the elongated shaft is oriented perpendicular to the shredding pin attachment plate, and wherein the elongated shaft is functionally connected to the shredding pin attachment plate at the center of mass of the shredding pin attachment plate, configured to transfer a rotational force applied to the elongated shaft to a plurality of shredding pins; and
   a plurality of shredding pins comprising:
      a shredding pin shaft; and
      a cooked meat piercing spike, disposed on the distal end of the shredding pin shaft, configured to pierce cooked meat,
      wherein the plurality of shredding pins is disposed on a surface of the shredding pin attachment plate.

8. A cooked meat shredding apparatus comprising:
   an elongated shaft, configured to receive a rotational force applied about an axis defined by the elongated shaft, and comprising a drill chuck engaging head disposed on the proximal end of the elongated shaft, configured to engage a power drill chuck;
   a shredding pin attachment plate comprising:
      rotational force transfer body disposed on the distal end of the elongated shaft, wherein the elongated shaft is oriented perpendicular to the rotational force transfer body, and wherein the elongated shaft is functionally connected to the rotational force transfer body at the center of mass of the rotational force transfer body, configured to transfer a rotational force applied to the elongated shaft to a plurality of shredding pins; and a plurality of threaded shredding pin connectors defined by the rotational force transfer body, configured to engage one or more threaded shredding pins; and a plurality of threaded shredding pins comprising:
  a shredding pin shaft;
  a threaded rotational body connector; and
  a cooked meat piercing spike, disposed on the distal end of the shredding pin shaft, configured to pierce cooked meat.

* * * * *